(12) United States Patent
Scott

(10) Patent No.: US 9,837,173 B2
(45) Date of Patent: Dec. 5, 2017

(54) CHEMICAL OPTIMISATION IN A MOLTEN SALT REACTOR

(71) Applicant: Ian Richard Scott, Warwickshire (GB)

(72) Inventor: Ian Richard Scott, Warwickshire (GB)

( * ) Notice: Subject to any disclaimer, the term of this patent is extended or adjusted under 35 U.S.C. 154(b) by 0 days.

(21) Appl. No.: 15/126,499

(22) PCT Filed: Feb. 19, 2015

(86) PCT No.: PCT/GB2015/050485
§ 371 (c)(1),
(2) Date: Sep. 15, 2016

(87) PCT Pub. No.: WO2015/140495
PCT Pub. Date: Sep. 24, 2015

(65) Prior Publication Data
US 2017/0084355 A1    Mar. 23, 2017

(30) Foreign Application Priority Data

Mar. 20, 2014 (GB) ................................. 1404976.1
Jun. 15, 2014 (GB) ................................. 1410659.5
Oct. 12, 2014 (GB) ................................. 1418030.1

(51) Int. Cl.
*G21C 3/17* (2006.01)
*G21C 3/04* (2006.01)
(Continued)

(52) U.S. Cl.
CPC ............... *G21C 3/041* (2013.01); *G21C 3/07* (2013.01); *G21C 3/10* (2013.01); *G21C 3/17* (2013.01);
(Continued)

(58) Field of Classification Search
CPC . G21C 3/041; G21C 3/17; G21C 3/18; G21C 3/20; G21C 3/52; G21C 1/16; G21C 1/22
See application file for complete search history.

(56) References Cited

U.S. PATENT DOCUMENTS 3,406,094 A    10/1968    Beisswenger et al.
3,459,636 A *  8/1969    Germer .................. G21C 3/041
                                                              376/418
(Continued)

FOREIGN PATENT DOCUMENTS

GB      2508537 A    6/2014
JP    2003-028976 A   1/2003
(Continued)

OTHER PUBLICATIONS

International Search Report and Written Opinion for corresponding International Application No. PCT/GB2015/050485 dated Jun. 12, 2015.
(Continued)

*Primary Examiner* — Sharon M Davis
(74) *Attorney, Agent, or Firm* — Renner, Otto, Boiselle & Sklar, LLP

(57) ABSTRACT

Use in a nuclear fission reactor of a sacrificial metal in a molten salt fuel containing actinide halides in order to maintain a predefined ratio of actinide trihalide to actinide tetrahalide without reducing actinide trihalide to actinide metal. A method of maintaining oxidation state of a molten salt containing actinide halides. The method comprises contacting the molten salt continuously with a sacrificial metal, the sacrificial metal being selected in order to maintain a predefined ratio of actinide trihalide to actinide tetrahalide without reducing actinide trihalide to actinide metal. A fuel tube containing a sacrificial metal is also described.

16 Claims, 2 Drawing Sheets

(51) Int. Cl.
*G21C 3/07* (2006.01)
*G21C 17/022* (2006.01)
*G21C 3/10* (2006.01)
*G21C 1/03* (2006.01)
*G21C 15/28* (2006.01)

(52) U.S. Cl.
CPC ........... *G21C 17/0225* (2013.01); *G21C 1/03* (2013.01); *G21C 15/28* (2013.01); *Y02E 30/40* (2013.01)

(56) References Cited

U.S. PATENT DOCUMENTS

| | | | | |
|---|---|---|---|---|
| 3,892,626 A | * | 7/1975 | Hirose | G21C 3/041 376/418 |
| 3,996,100 A | * | 12/1976 | Oguma | G21C 3/041 376/418 |
| 4,029,545 A | * | 6/1977 | Gordon | G21C 3/06 376/417 |
| 4,045,286 A | * | 8/1977 | Blum | G21C 1/03 376/288 |
| 4,200,492 A | * | 4/1980 | Armijo | G21C 3/20 376/417 |
| 4,613,479 A | * | 9/1986 | Foster | B32B 15/013 376/414 |
| 5,805,655 A | * | 9/1998 | Chan | G21C 3/20 106/14.05 |
| 2013/0083878 A1 | | 4/2013 | Massie et al. | |

FOREIGN PATENT DOCUMENTS

| | | |
|---|---|---|
| JP | 2014-010022 A | 1/2014 |
| WO | WO 2014/128457 A1 | 8/2014 |

OTHER PUBLICATIONS

International Preliminary Report on Patentability for corresponding International Application No. PCT/GB2015/050485 dated May 18, 2016.

* cited by examiner

CHEMICAL OPTIMISATION IN A MOLTEN SALT REACTOR

TECHNICAL FIELD

The present invention relates to chemical optimisation of a molten salt fuel for a fission reactor.

BACKGROUND

Nuclear fission reactors using fissile fuels in the form of molten halide salts have many advantages over solid fuelled reactors but generally suffer from problems due to continuous changes in the chemical composition of the molten fuel salt during operation as fission products accumulate and a net release of halogen from the actinide tri or tetrahalide fuel occurs. Most designs of molten salt reactors incorporate a continuous chemical treatment process in the fuel circulation to manage this problem, however doing so involves adding complex chemical engineering systems into a highly radioactive environment.

A much simpler design of molten salt reactor was described in GB 2508537 in which the fuel salt was held in static tubes in which convection or other mixing processes allowed heat to pass from the fuel salt to the tube wall at a sufficient rate for the reactor to have a practical energy production. Such static fuel tubes do not permit continuous active adjustment of the chemistry of the fuel salt. In GB 2508537 it was suggested that inclusion of metals such as niobium, titanium or nickel in the fuel salt or on the fuel tube would be useful in scavenging excess halogen released during fission but no specific suggestions were made for controlling deleterious effects of fission products.

SUMMARY

According to an aspect of the present invention, there is provided use in a nuclear fission reactor of a sacrificial metal in a molten salt fuel containing actinide halides in order to maintain a predefined ratio of actinide trihalide to actinide tetrahalide without reducing actinide trihalide to actinide metal.

According to a further aspect of the present invention, there is provided a method of maintaining oxidation state of a molten salt containing actinide halides. The method comprises contacting the molten salt continuously with a sacrificial metal, the sacrificial metal being selected in order to maintain a predefined ratio of actinide trihalide to actinide tetrahalide without reducing actinide trihalide to actinide metal.

According to a further aspect of the present invention, there is provided a fuel tube for use in a nuclear fission reactor. The fuel tube is configured to contain a molten salt comprising actinide halides. The fuel tube comprises a sacrificial metal such that in use the sacrificial metal is in contact with the molten salt, or with liquid condensed from vapour evolved from the molten salt. The sacrificial metal is selected in order to maintain a predefined ratio of actinide trihalide to actinide tetrahalide without reducing actinide trihalide to actinide metal.

According to a further aspect of the present invention, there is provided a method of managing gas production in a fission reactor comprising fuel tubes containing a molten salt fissile fuel. The method comprises contacting the molten salt fissile fuel with a sacrificial metal. The sacrificial metal is selected in order to control a level of volatile iodine compounds released from the molten salt. The method further comprises permitting gasses produced during fission of the molten salt fissile fuel to pass out from the fuel tubes into a coolant surrounding the fuel tube or into a gas space in contact with the coolant.

Further aspects are set out in claim 2 et seq.

BRIEF DESCRIPTION OF THE DRAWINGS

Some preferred embodiments will now be described by way of example only and with reference to the accompanying drawings, in which.

DETAILED DESCRIPTION

Figure 1:
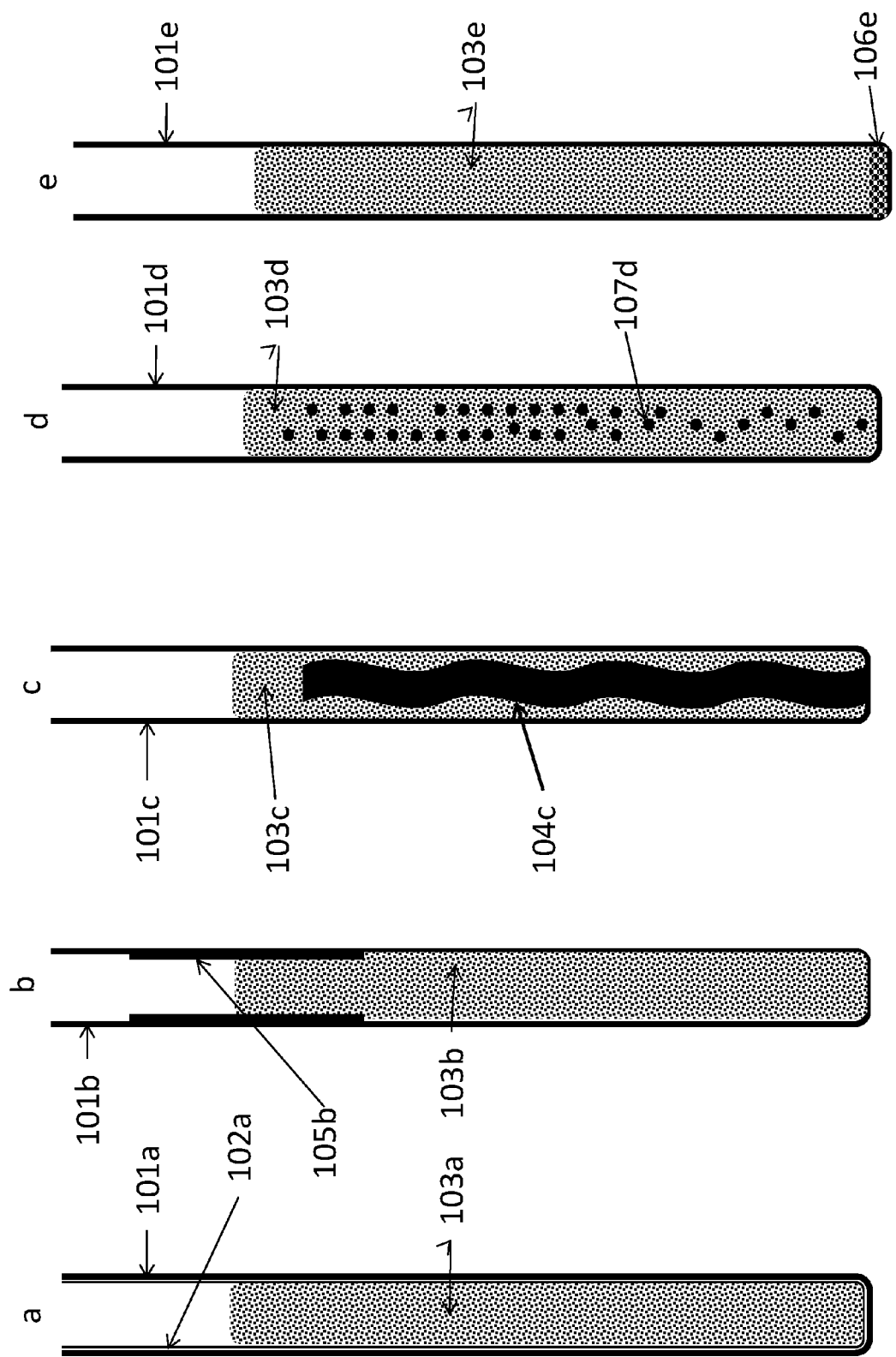
FIG. 1 shows examples of fuel tubes containing molten fuel salt.

A systematic analysis of the effects of incorporating sacrificial metals into the fuel salt or fuel tube has been carried out resulting in the identification of particularly effective metals for this purpose. Three factors dictate the suitability of any particular sacrificial metal. These are maintaining a low redox state and hence low metal corrosive power and low concentration of actinide tetrahalides as indicated by a high ratio of trivalent to tetravalent actinides in the molten salt while not reducing actinide (usually uranium) halides to the metal form at temperatures approaching the boiling point of the salt mixture chemically binding potentially volatile fission products in the molten salt and preventing their entering the gaseous phase above the salt. Particularly important is to minimise volatile iodine compounds especially $TeI_2$.

Converting reactive tellurium to stable tellurides to prevent tellurium induced embrittlement of metals, especially nickel alloys, in contact with the molten salt Thermodynamic calculations of these three factors have been carried out using a software program HSC Chemistry 7. The results are shown in Table 1.

The parameters of the thermodynamic calculation were as follows. The sacrificial metal was provided as a separate pure metallic phase in excess over other reactants.

| Salt composition in moles: | |
| --- | --- |
| NaCl | 428 |
| $UCl_3$ | 225 |
| $UCl_4$ | 10 |
| Cd | 0.38 |
| I | 0.84 |
| In | 0.04 |
| Sb | 0.14 |
| Se | 0.24 |
| Te | 1.47 |

This represents a typical fuel salt towards the end of its useful life in a fast spectrum nuclear reactor. The group 1 and 2 metals, lanthanides, noble metals and noble gasses have been excluded as they were shown to have no effect on the chemistry involved. Gas composition was determined at 600° C. and reduction of uranium to the metal at 1500° C.

Examination of table 1 indicates that zirconium, titanium, niobium, vanadium, zinc, chromium, silver and manganese are suitable as sacrificial metals to control redox state without producing uranium metal in situations where control of volatile species is not important.

Where, in addition, control of dangerous volatile species such as iodine is important then only zirconium, titanium, vanadium, chromium and silver are useful. These same metals with the exception of vanadium are also effective in controlling tellurium levels.

Silver as a sacrificial metal appears to have unique properties. Despite its high Pauling electronegativity, it is very effective at reducing $UCl_4$ concentrations, reducing volatile iodine species and scavenging tellurium. The high affinity for iodine is a known property of silver but the efficacy in reducing $UCl_4$ to $UCl_3$ is unexpected.

Combinations of multiple sacrificial metals produce still more favourable results where particular sacrificial metals are more effective against the three factors set out above.

While data has been presented for chloride salts, the same principles and useful sacrificial metals can be applied to fluoride salt systems.

While passive control of molten salt chemistry with sacrificial metals is of general value for molten salt reactors, it is particularly important for reactors such as that described in GB 2508537 where access to the molten salt for active management of the chemistry, for example by adding small amounts of reactive metals, is challenging. In such a reactor it is useful for the sacrificial metal to be applied to the vessel containing the molten fuel salt both above and below the level of the salt. This prevents occlusion of the sacrificial metal by deposited noble metal fission product. It can also be advantageous, particularly where the sacrificial metal has a significant neutron absorption, for the sacrificial metal not to be located near the centre of the reactor core so that any neutron absorption is minimised.

The sacrificial metal can be provided in a variety of ways. FIGS. 1a to 1e show examples of fuel tubes incorporating sacrificial metal. FIG. 1a shows a fuel tube 101a containing molten salt 103a and an internal coating 102a of the sacrificial metal applied to the inner wall of the fuel tube. The sacrificial metal can be applied to the inner wall of the fuel tube by a variety of methods including, but not restricted to, electroplating, plasma spraying, dipping into molten metal, brazing, welding, chemical vapour deposition, sputtering, vacuum deposition, conversion coating, spraying, physical coating and spin coating. Alternatively, as shown in FIG. 1b, the internal coating 105b may be applied to only part of the fuel tube 101b, provided that part is in contact with the fuel salt 103b. FIG. 1c shows a further embodiment, in which a metal insert 104c made from or coated with the sacrificial metal is placed within the molten salt 103c inside the fuel tube 101c. This insert may be shaped so as to aid the convective mixing of the fuel salt, e.g. spiral shaped. FIG. 1d shows a yet further embodiment, where the sacrificial metal is provided as particles 107d suspended in the molten salt 103d within the fuel tube 101d, or as coatings on such particles. FIG. 1e shows an embodiment where the sacrificial metal is provided as particles 106e which are allowed to sink in the fuel salt 103e to the bottom of the fuel tube 101e.

Use of a sacrificial metal such as titanium, vanadium, chromium or silver reduces the vapour pressure of many radioactive species produced by the fuel salt to very low levels. This makes possible much simpler methods to manage the gasses released from the fuel which, with suitable sacrificial metals present, are predominantly the noble gasses, xenon and krypton, cadmium and zirconium halides although the concentration of the latter is substantially reduced if zirconium is used as the sacrificial metal. Accumulation of these gasses in fuel elements is a major limitation in the longevity of such fuel elements as if the gas is permitted to accumulate it generates high pressures which can rupture the cladding of the fuel elements.

It is known that, particularly in sodium cooled fast reactors, fission gasses can be allowed to vent from the fuel elements into the sodium coolant. This practice was used in the early days of development of such reactors but was abandoned because of the presence of highly radioactive, relatively long half life, cesium in the vented gas. The cesium contaminated the sodium coolant and made disposal of the sodium extremely challenging as well as creating a major hazard in the event of a sodium fire. The practice was therefore discontinued. Similar venting procedures have never been suggested for reactors other than sodium cooled reactors.

Molten salt reactors are unique in not accumulating cesium in the form of the volatile metal, which is released as a gas from metallic nuclear fuel elements and accumulated in partially leaking high pressure gas microbubbles in ceramic nuclear fuel elements. In molten salt reactors the cesium forms non-volatile cesium halide which has negligible vapour pressure at the temperatures involved. It is therefore possible to vent fission gas from molten salt reactors into the coolant without causing serious levels of contamination. This is particularly relevant for the molten salt reactor design described in GB 2508537 where the alternative is a relatively complex pipework arrangement to collect the gasses.

The gasses released in this way still contain appreciable quantities of radioactive iodine but of short half life. The radioactive iodine will contaminate the coolant but will decay to harmless levels in a relatively short time period. However, inclusion of a sacrificial metal such as magnesium, zirconium, scandium, titanium, manganese, aluminium, vanadium, chromium and/or silver reduces the amount of volatile iodine to a lower level. There is thus a major advantage to combining the use of sacrificial metals as described above with a gas venting system for the fuel tubes. Suitable gas venting systems are described in the literature (ORNL-NSIC-37, Fission Product release and transport in liquid metal fast breeder reactors) and include "diving bell" apparatus, narrow or capillary tubing and gas permeable sinters located above level of the fuel salt. The gas can be vented into the gas space above the coolant salt or directly into the coolant salt where it will bubble to the surface.

Figure 2:
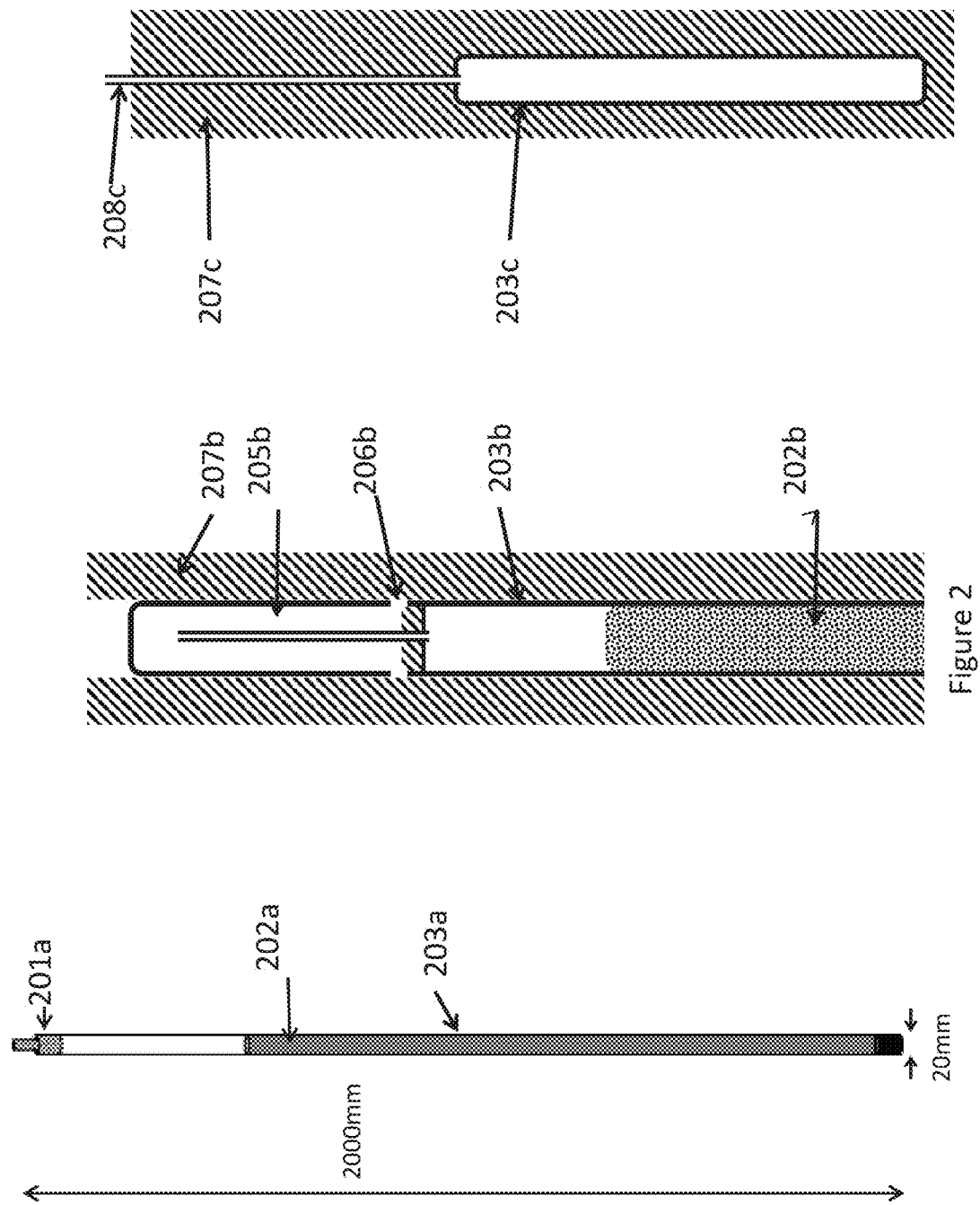
FIG. 2 shows examples of three methods to allow fission gas emission from fuel tubes.

FIG. 2a to c shows examples of three methods to allow fission gas emission from fuel tubes. The method shown in 2a uses closure of the upper opening of the fuel tube 203a with a sintered metal plug 201a where the sinter pore size is adjusted to allow gasses to pass but not to allow liquids, either the fuel salt 202a or the coolant outside the fuel tube to pass. FIG. 2b shows a fuel tube 203b containing fuel salt 202b where the fuel tube is capped by a diving bell assembly 205b. The diving bell assembly 205b allows gas to pass from the fuel tube 203b to the coolant 207b via vents 206b in the wall of the fuel tube, but coolant 207b sucked into the diving bell assembly 205b cannot mix with the fuel salt 202b. FIG. 2c shows a fuel tube 203c vented directly to the gas space above the coolant 207c via a narrow tube or capillary tube 208c.

The invention claimed is:

1. A method of managing gas production in a nuclear fission reactor, the method comprising: providing a sacrificial metal in direct physical contact with a molten salt fissile fuel, and preventing, with the sacrificial metal, accumulation of volatile iodine compounds released from the molten salt, wherein the sacrificial metal is one of or a combination of any of zirconium, vanadium, chromium and silver.

2. The method according to claim 1 wherein the molten salt fuel comprises actinide halides.

3. A method of managing gas production in a fission reactor comprising fuel tubes containing a molten salt fissile fuel, the method comprising: bringing into direct physical contact the molten salt with a sacrificial metal, and preventing, with the sacrificial metal, accumulation of volatile iodine compounds released from the molten salt, wherein the sacrificial metal is one of or a combination of any of zirconium, vanadium, chromium and silver.

4. The method according to claim 3, further comprising: permitting gasses produced during fission of the molten salt fissile fuel to pass out from the fuel tubes into a coolant surrounding the fuel tube or into a gas space in contact with the coolant.

5. The method according to claim 3, wherein the sacrificial metal is provided as a plating in the fuel tubes.

6. The method according to claim 3, wherein the sacrificial metal is provided as particles or as a coating on particles in the molten salt.

7. The method according to claim 3, wherein the sacrificial metal is provided as an insert immersed in the molten salt or as a coating on an insert immersed in the molten salt.

8. The method according to claim 3, wherein the molten salt fuel comprises actinide halides.

9. A fuel tube for a nuclear fission reactor, the fuel tube comprising: a molten salt fissile fuel and a sacrificial metal in direct physical contact with the molten salt, wherein the sacrificial metal is configured to prevent accumulation of volatile iodine compounds released from the molten salt, and wherein the sacrificial metal is one of or a combination of any of zirconium, titanium, vanadium, chromium and silver.

10. A fuel tube according to claim 9, wherein the fuel tube is configured to permit gasses to pass out from the fuel tube when the fuel tube is inserted into a nuclear fission reactor, the gasses passing out into coolant of the nuclear fission reactor or into gas space above the coolant.

11. The fuel tube according to claim 10, wherein an opening of the fuel tube is closed with a sintered plug, the sintered plug being configured to allow passage of gasses and not to allow passage of liquids.

12. A fuel tube according to claim 10, wherein the fuel tube extends vertically into the gas space when the fuel tube is inserted into the nuclear fission reactor, and comprises an opening within the gas space.

13. A fuel tube according to claim 12, wherein the fuel tube further comprises a capillary tube extending vertically into the gas space, and the opening is at an upper end of the capillary tube.

14. A fuel tube according to claim 10, wherein the fuel tube further comprises a diving bell assembly with an outer opening immersed in the coolant when the fuel tube is inserted into the nuclear fission reactor.

15. The fuel tube according to claim 9, wherein the sacrificial metal is provided as plating on a surface of the fuel tube.

16. The fuel tube according to claim 9, wherein the sacrificial metal is provided as particles or as a coating on particles in the fuel tube.

\* \* \* \* \*